May 14, 1946.   D. F. ALEXANDER   2,400,329
REFRIGERATING APPARATUS
Filed July 27, 1944
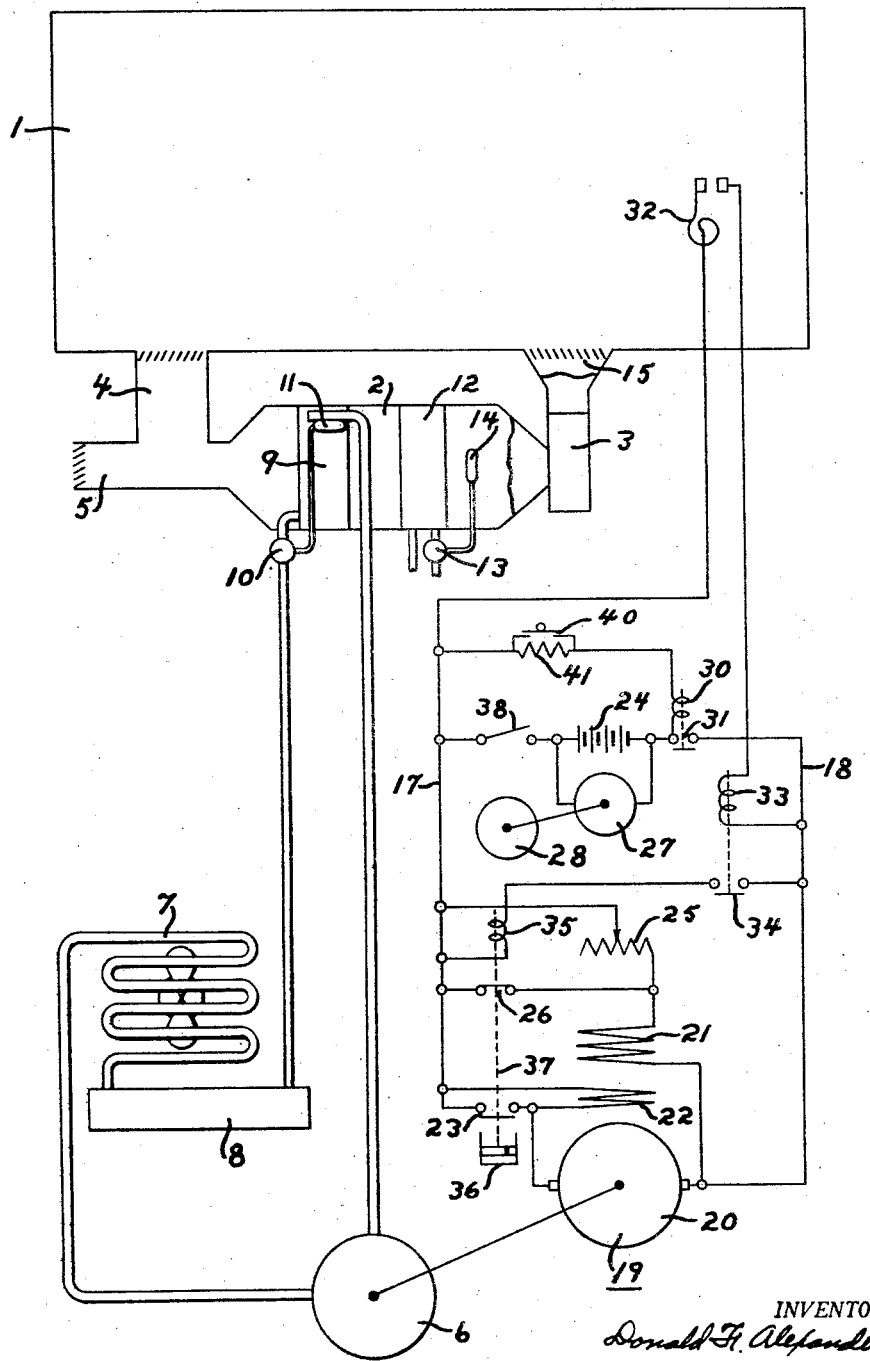
INVENTOR.
Donald F. Alexander.
BY Spencer, Hardman & Fehr,
His Attorneys.

Patented May 14, 1946

2,400,329

UNITED STATES PATENT OFFICE 2,400,329

REFRIGERATING APPARATUS

Donald F. Alexander, Oakwood, Ohio, assignor to General Motors Corporation, Dayton, Ohio, a corporation of Delaware Application July 27, 1944, Serial No. 546,879

10 Claims. (Cl. 62—4)

This invention relates to refrigeration and more particularly to an improved control arrangement for use in air conditioning systems and the like.

It is an object of this invention to reduce the number of controls required in an air conditioning system without sacrificing comfort.

Another object of this invention is to provide an improved arrangement for controlling the speed of the compressor motor.

Still another object of this invention is to provide an improved compressor motor starting arrangement wherein the motor is started as a compound motor and is run as a shunt motor.

Further objects and advantages of the present invention will be apparent from the following description, reference being had to the accompanying drawing, wherein a preferred form of the present invention is clearly shown.

In the drawing is shown a diagrammatic view of my invention as applied to a preferred form of air conditioning system.

One of the most desirable arrangements for controlling an air conditioning system is to operate the compressor continuously and to vary the speed of the compressor so as to balance the output of the compressor with the refrigeration requirements. The prior art arrangements for varying the speed of the compressor have required troublesome control or have otherwise been unsatisfactory for use in air conditioning systems whereas the arrangement shown eliminates the troublesome controls without sacrificing performance.

Referring now to the drawing, reference numeral 1 designates a space to be conditioned, reference numeral 2 designates an air conditioning chamber and reference numeral 3 designates a fan for circulating air through the chamber 2. The air to be conditioned may be room air from the return air duct 4, fresh air from the fresh air duct 5 or it may be a mixture of both in any desired ratio.

The refrigeration system comprises a compressor 6, preferably of the rotary type, a condenser 7, a receiver 8 and an evaporator 9 located in the chamber 2. The flow of refrigerant to the evaporator 9 is controlled by a thermostatic expansion valve 10 provided with the usual form of thermostat bulb 11 arranged in thermal exchange with the suction line adjacent the outlet of the evaporator. Any other type of refrigerant control could be used if desired.

Reference numeral 12 designates a reheat coil which may be supplied with a heating medium from any suitable supply such as a steam supply. The amount of reheat may be controlled in any suitable manner either in response to the temperature, humidity or a combination of both. For purposes of illustration we have shown a valve 13 controlled by a thermostat 14 responsive to the temperature of the air leaving the coil 12. The thermostat 14 could be placed directly within the conditioned space or in the outside air so as to respond to the temperature outside the conditioned space. One advantage of the location shown is that the air flowing through the outlet grill may be maintained at a substantially constant temperature.

The compressor 6 is driven by a compound wound direct current motor 19 having an armature 20, a shunt field 21 and a series field 22. In order to make it possible to start the motor at full line voltage by connecting it across the lines 17 and 18 which are connected to the battery 24 and in order to obtain the desired speed control without resorting to the use of external field resistors, a switch 23 has been provided for shorting the series field 22 whereby the motor may be started as a compound motor with the field 22 in series with the armature 20 to cut down the starting current and may be run, if desired, as a shunt motor without the field coil 22 in series with the armature 20. A resistance element 25 of the variable type is provided in series with the shunt field coil 21 as shown. This resistance may be varied so as to adjust the speed of the motor for the particular refrigeration load and for the voltage supplied from the source. This adjustment is made when the system is installed and is not changed during normal operation. This resistance is undesirable in the circuit at times and is short circuited by the switch 26 in a manner explained more fully hereinafter.

The motor 19 is energized by the direct current generator 27 when the generator is operating at generating conditions and is energized by the battery 24 at other times. The generator 27 is driven by the power unit 28 which may be either a direct current motor, an alternating current motor, a car axle, an internal combustion engine or any suitable prime mover. In the drawing I have diagrammatically shown an electric motor for the power unit. In the case of railway installations the generator 27 would be driven by the electric motor 28 only when an outside source of electricity is available and would be operated from the car axle (not shown) when the car travels at high enough speeds to operate the generator. Generating systems of this type are now well known and need no further description.

Reference numeral 30 designates a conventional low voltage relay for breaking the circuit at 31 when the line voltage is too low for proper operation of the motor 19. A reset button 40 which shorts out the resistance 41 permits reclosing of the switch 31 at will in a conventional manner.

The speed of the motor may be controlled by any suitable means which is responsive to refrigeration requirements. Thus it may be controlled in response to the temperature, relative humidity, absolute humidity or a combination of the above and the control instrument may be responsive to the inside air temperature, the outside air temperature, or a combination of the two. For purposes of illustration I have shown a dry bulb thermostat 32 located in the conditioned space for controlling the speed of the motor 19.

The thermostat 32 controls the flow of current through the solenoid 33 which closes the switch 34 when the solenoid is energized. Closing of switch 34 energizes the solenoid 35 which operates to open the switch 26 and close the switch 23 after a predetermined time delay such as 10 or 15 seconds. A conventional dash pot 36 serves to delay the upward movement of the switch operating arm 37 when the solenoid 35 is energized. By virtue of the above described arrangement, when the master control switch 38 is first closed, the switch operating arm 37 will not operate the switches 23 and 26 to change the circuit connections within the first 10 or 15 seconds regardless of the position of switch 34.

Closing of the switch 38 will serve to start up the motor 19 at a reduced speed as a compound motor with the shunt winding 21 connected directly across the supply lines 17 and 18 and with the series winding 22 in series with the armature 20. Whenever the thermostat 32 calls for full refrigeration either when the motor 19 is first started up or at any later time, the solenoid 35 will lift the switch arm 37 upwardly after the predetermined time delay so as to short circuit the series winding 22 through the switch 23 and so as to place the resistance 25 in series with the shunt field 21 with the result that the speed of the motor is increased. The preferred speeds of operation are 1400 and 1750 R. P. M. As pointed out hereinabove, the motor will always be started at the low speed. The motor will be run at the low speed unless maximum refrigeration is required in which case the motor will in effect be connected into a shunt wound motor without any resistance in series with the armature after the delay explained hereinabove.

The circuit arrangement shown and described herein makes it possible to do without the usual starting box or step resistors mounted externally of the motor for cutting down on the armature current during the starting of the motor. The motor 19 may be started on full line voltage without drawing an excessive amount of starting current because the series field 22 is always in series with the armature 20 during the starting of the motor. The time delay arrangement insures that the initial starting of the motor will always be as a compound motor, regardless of refrigeration requirements; thus minimizing the electrical and mechanical disturbances to the parts.

While the form of embodiment of the invention as herein disclosed, constitutes a preferred form, it is to be understood that other forms might be adopted, as may come within the scope of the claims which follow.

What is claimed is as follows:

1. In an air conditioning system for an enclosure; a volatile refrigerant system including an evaporator, condenser and compressor; means for flowing air to be conditioned for said enclosure in thermal exchange with said evaporator; a compound wound motor for operating said compressor; and means responsive to the refrigeration requirements for shorting the series field of said motor for speed control purposes.

2. In an air conditioning system for an enclosure; a volatile refrigerant system including an evaporator, condenser and compressor; means for flowing air to be conditioned in thermal exchange relationship with said evaporator; a motor for operating said compressor; said motor having a shunt field and a series field; means for starting said motor at a reduced speed at full line voltage and for operating said motor at high speed on full line voltage; said last named means comprising means for short circuiting said series field in response to a demand for increased refrigeration capacity.

3. In an air conditioning system for an enclosure; a volatile refrigerant system including an evaporator, condenser and compressor; means for flowing air to be conditioned for said enclosure in thermal exchange with said evaporator; a compound wound motor for operating said compressor; said motor having a shunt field winding and a series field winding connected in series with the motor armature; means for operating said motor at varying speeds at full line voltage at all times including means for short circuiting at least a portion of the series field for high speed motor operation.

4. In an air conditioning system for an enclosure, means forming an air conditioning chamber; means for flowing either recirculated air, fresh air or a mixture of both through said chamber and into said enclosure; a refrigerant evaporator in said chamber; refrigerant liquefying means for supplying liquid refrigerant to said evaporator including a compound wound motor and a refrigerant compressor driven by said motor; means for operating said motor as a compound motor at slow speed some of the time and as a shunt motor at high speed some of the time; and means responsive to refrigeration requirements for changing over from shunt motor operation to compound motor operation.

5. In a system for conditioning air for an enclosure, means forming an air conditioning chamber, means for flowing air to be conditioned through said chamber and into said enclosure, means for cooling the air flowing through said chamber including a volatile refrigerant system including a motor driven compressor, motor control switch means for starting and stopping said motor, said motor having a shunt field coil and a series field coil, and means for short circuiting said series field coil in response to a demand for increased refrigeration.

6. In a system for conditioning air for an enclosure, means forming an air conditioning chamber, means for flowing air to be conditioned through said chamber and into said enclosure, means for cooling the air flowing through said chamber including a volatile refrigerant system including a motor driven compressor, motor control switch means for starting and stopping said motor, said motor having a shunt field coil and a series field coil, means for short circuiting said series field coil in response to a demand for increased refrigeration, and time delay means preventing short circuiting of said series field within a predetermined time interval after closing of said motor control switch means.

7. In a refrigerating system; an evaporator; a condenser; a compressor; refrigerant flow connections between said evaporator, condenser and compressor; a motor for operating said compressor having an armature, a first field coil, and a second field coil; power supply lines; a resistance element; means for connecting said first field coil and said resistance element in series across said power lines; means for connecting said armature and said second field coil in series across said power lines; a first switch for shorting said resistance element; a second switch for shorting said second field coil; and means responsive to refrigeration requirements for operating said first and second switches so as to vary the speed of said motor.

8. In a refrigerating system; an evaporator; a condenser; a compressor; refrigerant flow connections between said evaporator, condenser and compressor; a motor for operating said compressor having an armature, a first field coil, and a second field coil; power supply lines; a resistance element; means for connecting said first field coil and said resistance element in series across said power lines; means for connecting said armature and said second field coil in series across said power lines; a first switch for shorting said resistance element; a second switch for shorting said second field coil; and means responsive to refrigeration requirements for operating said first and second switches so as to vary the speed of said motor; switch means for starting and stopping said compressor; and means for preventing shorting said second coil means during the starting of said motor by said last named switch means.

9. In a temperature and humidity regulating system for an enclosure, means forming an air passage, an evaporator in said passage, means for supplying liquid refrigerant to said evaporator including a compressor, and means for varying the speed of said compressor in response to changes in the temperature in said enclosure, said means for varying the speed of said compressor comprising a compound wound motor in which means is provided for short circuiting the series field for speed control purposes.

10. In an air conditioning system for an enclosure; a volatile refrigerant system including an evaporator, condenser and compressor; means for flowing air to be conditioned for said enclosure in thermal exchange with said evaporator; a variable speed motor for operating said compressor; said motor having a field circuit and an armature circuit; means for varying the resistance of said armature circuit from a minimum value to a maximum value; means for varying the resistance of said field circuit from a minimum value to a maximum value; motor control means including means responsive to refrigeration requirements controlling both of said last named means so as to start said motor with maximum resistance in the armature circuit and minimum resistance in the field circuit regardless of refrigeration requirements and to operate said motor at full speed with minimum resistance in the armature circuit and an increased resistance in the field circuit when full refrigeration is required.

DONALD F. ALEXANDER.